United States Patent
Stender

(10) Patent No.: US 8,655,577 B2
(45) Date of Patent: Feb. 18, 2014

(54) DEVICE AND METHOD FOR AUTOMATICALLY ADJUSTING THE HORIZONTAL RIDE LEVEL OF A UTILITY VEHICLE

(75) Inventor: Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 402 days.

(21) Appl. No.: 12/734,247

(22) PCT Filed: Jul. 26, 2008

(86) PCT No.: PCT/EP2008/006170
§ 371 (c)(1), (2), (4) Date: Oct. 28, 2010

(87) PCT Pub. No.: WO2009/052877
PCT Pub. Date: Apr. 30, 2009

(65) Prior Publication Data
US 2011/0046848 A1 Feb. 24, 2011

(30) Foreign Application Priority Data
Oct. 26, 2007 (DE) .......................... 10 2007 051 262

(51) Int. Cl.
*G06F 17/10* (2006.01)
*G06G 7/48* (2006.01)

(52) U.S. Cl.
USPC .................... 701/124; 701/38; 701/40; 701/1

(58) Field of Classification Search
USPC ............................................. 701/37–40, 124
See application file for complete search history.

(56) References Cited

U.S. PATENT DOCUMENTS

| | | | |
|---|---|---|---|
| 2,993,705 A | 7/1961 | D'Avigdor | |
| 4,658,508 A | 4/1987 | Oberg | |
| 4,676,103 A | 6/1987 | Nakajima | |
| 4,999,777 A * | 3/1991 | Schussler et al. | 701/38 |
| 5,047,934 A * | 9/1991 | Saito | 701/56 |
| 5,180,024 A | 1/1993 | Eto | |
| 5,941,920 A * | 8/1999 | Schubert | 701/37 |
| 6,273,203 B1 | 8/2001 | Paggi et al. | |
| 6,384,719 B1 | 5/2002 | Dieckmann | |
| 6,446,980 B1 | 9/2002 | Kutscher et al. | |
| 6,859,700 B2 | 2/2005 | Bolzmann et al. | |
| 6,923,453 B2 * | 8/2005 | Pivac | 280/6.154 |
| 7,210,551 B2 | 5/2007 | Krause et al. | |
| 7,231,825 B2 | 6/2007 | Davidson | |
| 7,357,397 B2 * | 4/2008 | Brookes et al. | 280/6.15 |
| 2001/0008986 A1 * | 7/2001 | Brown et al. | 701/1 |
| 2003/0094775 A1 * | 5/2003 | Pivac | 280/6.154 |
| 2007/0067080 A1 * | 3/2007 | Messih et al. | 701/37 |
| 2007/0129865 A1 * | 6/2007 | Kim | 701/37 |

FOREIGN PATENT DOCUMENTS

| | | |
|---|---|---|
| DE | 35 45 630 | 6/1987 |
| DE | 37 08 294 | 9/1988 |
| DE | 41 31 077 A1 | 4/1992 |
| DE | 41 01 060 | 7/1992 |

(Continued)

*Primary Examiner* — Bhavesh V Amin
(74) *Attorney, Agent, or Firm* — Kramer Levin Naftalis & Frankel LLP

(57) ABSTRACT

A device and a method for improved automatic ride level control of a utility vehicle on an inclined underlying surface use a lateral acceleration sensor to sense the inclination of the utility vehicle in the stationary state or with a reduced speed in conjunction with a chassis of adjustable height.

20 Claims, 3 Drawing Sheets

(56) References Cited

FOREIGN PATENT DOCUMENTS

| | | |
|---|---|---|
| DE | 41 14 992 | 8/1992 |
| DE | 42 36 328 | 9/1993 |
| DE | 199 04 908 | 8/2000 |
| DE | 199 36 503 | 3/2001 |
| DE | 100 22 834 A1 | 11/2001 |
| DE | 101 01 352 | 7/2002 |
| DE | 102 49 719 A1 | 5/2004 |
| DE | 103 16 760 A1 | 10/2004 |
| DE | 10 2004 016 910 | 10/2005 |
| DE | 10 2005 052 892 | 5/2006 |
| DE | 10 2005 012 673 | 10/2006 |
| EP | 0 994 009 | 4/2000 |
| EP | 1 104 732 A1 | 6/2001 |
| EP | 1 324 053 A1 | 7/2003 |
| FR | 2 809 196 | 11/2001 |
| WO | WO 2007/036556 | 4/2007 |

* cited by examiner

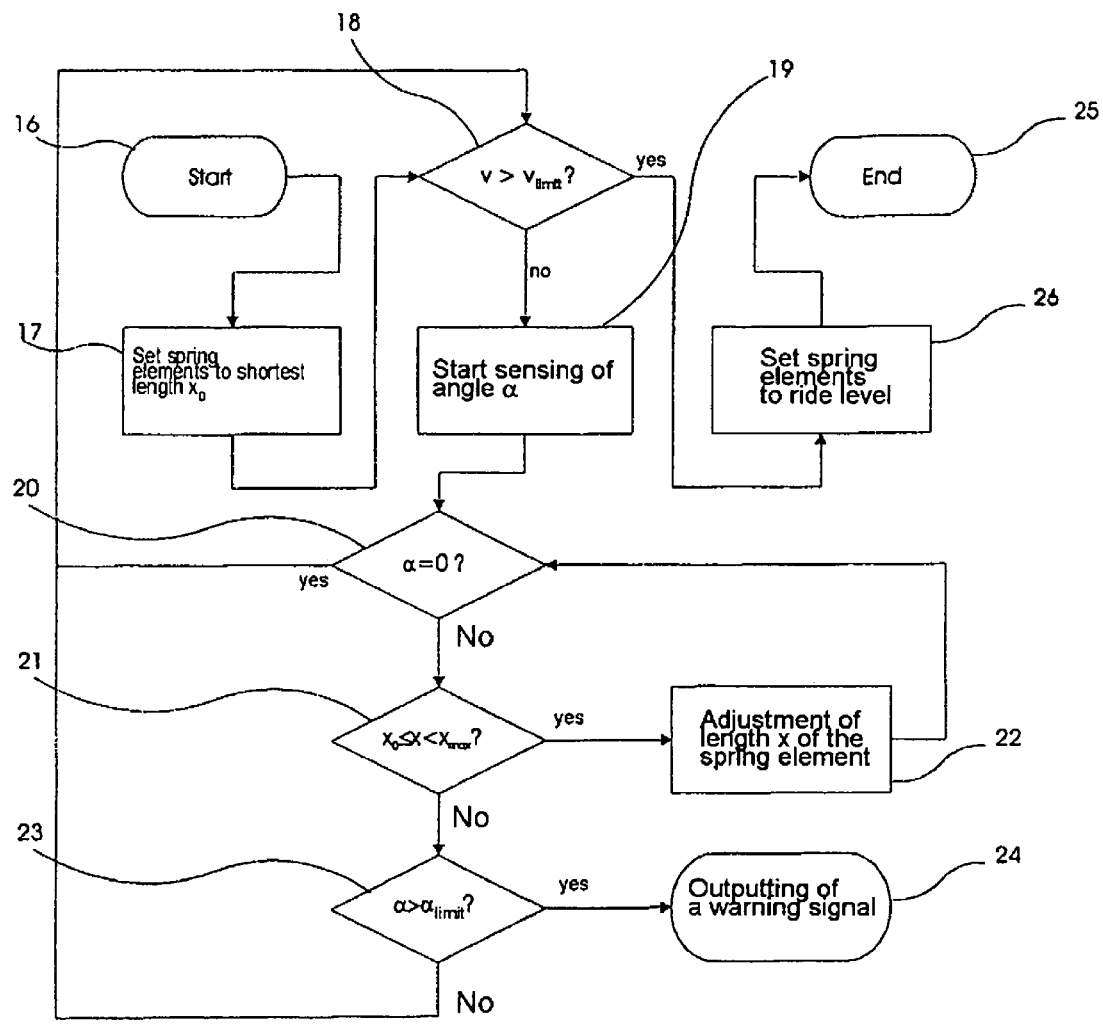

DEVICE AND METHOD FOR AUTOMATICALLY ADJUSTING THE HORIZONTAL RIDE LEVEL OF A UTILITY VEHICLE

FIELD OF THE INVENTION

The present invention generally relates to a device and a method for automatically adjusting the horizontal ride level of a utility vehicle having a vehicle body, in particular one with an element that can pivot about a longitudinal axis or a transverse axis, and a ride-level-control system that has spring elements of adjustable length and a control unit.

BACKGROUND OF THE INVENTION

Utility vehicles (also referred to below as "vehicle" for the sake of greater ease of reading) which are located or moving on inclined surfaces are subjected to an increased risk of tipping over, in particular if they have a high center of gravity. The risk of tipping over is increased for a vehicle that has a pivoting element such as, for example, a dump trough or a crane, mounted thereon. If the pivoting movement of the element is carried out while the vehicle is located on an inclined underlying surface and as a result the vehicle body is inclined laterally, and if the pivoting element moves in the direction of the inclination of the vehicle, this also leads to a displacement of the center of gravity in the same direction.

If the element is pivoted to such an extent that the vector of the weight combined at the center of gravity no longer passes through the supporting surface of the vehicle, the resulting moment causes the vehicle to tip over.

Ride-level-control devices are used to prevent the risk of tipping over. They permit the distance between the wheels and the vehicle body to be changed individually for each wheel, for pairs of wheels or for pairs of axles. This is usually done by means of an electronic control unit that is operated manually by means of an operator control unit, on the basis of visual estimation of the inclination by the driver of the vehicle. Devices of this type for chasses with air suspension are known by the abbreviation "ECAS" and are commercially available. Furthermore, there are also designs with mechanical valves, referred to as rotary slide valves.

Automatic compensating devices that sense the changes in length of the spring elements on one side of the vehicle by means of travel sensors and initiate the compensating movement in accordance with a programmed algorithm are also known (see DE 100 22 834 A1).

The foregoing devices have the common disadvantage that the actual inclination is not sensed directly. The inclined side of the utility vehicle may sink, for example, into soft ground, which is generally encountered in off-road situations, on unmetalled roadways or on construction sites. This is reliably noted neither by the previously known devices nor by the driver of the vehicle.

SUMMARY OF THE INVENTION

Generally speaking, it is an object of the present invention to provide a method and a device that improve control over the inclination of a vehicle, which is conditioned by the underlying surface or the load distribution.

According to embodiments of the present invention, this object is achievable by means of a device that has a sensor for sensing the angle between the vehicle body and horizontal; the sensor being connectable to the control unit of the ride-level-control system in order to trigger the ride-level-control process as a function of the sensed angle.

Information about the angle of inclination of the vehicle body, which occurs relative to the horizontal, should be directly and reliably sensed. If the angle of inclination changes during a pivoting process or due to variable ground conditions, the inventive embodiments ensure that the sensed inclination corresponds to the actual inclination of the vehicle body. Accordingly, the sensors utilized in the inventive embodiments are capable of sensing the current angle of inclination independently of the position of the vehicle and of the attentiveness of the vehicle driver, and of initiating an appropriate ride-level-control process.

In a preferred embodiment of the present invention, the sensor is a transverse acceleration sensor. The transverse acceleration sensor senses the inclination of the vehicle body relative to the horizontal in the stationary state or during straight-a head and slow travel of the utility vehicle.

In one embodiment, the sensor is designed to output a signal that is assigned to or represents the sensed angle between the vehicle body and horizontal, and is connected to the ride-level-system control unit via data transmission lines. It is therefore also possible to generate a warning signal. The data transmission can be effected by means of cable lines; but, it is also possible to use wireless transmission devices and methods.

In a further embodiment, the control unit is designed to bring about length adjustment of the spring elements as a function of the received signal of the sensor. Depending on the type of spring elements, the control unit converts the angle that is to be compensated into a length adjustment of the spring travel. This can be done by adjusting a stop ring with a thread on an actuating spindle in the case of helical springs, or, in the case of pneumatic spring bellows, by increasing the quantity of air in the interior of the bellows.

In another embodiment of the invention, the spring elements are embodied by means of air spring bellows. Above and beyond the good suspension comfort of such suspension systems, the air spring bellows are well suited for adjusting the length of the spring travel and therefore the vehicle ride level quickly over a suitable large adjustment range $x_0 \leq x \leq x_{max}$ by increasing the quantity of air in the bellows or by letting out air.

In a further embodiment of the invention, the spring elements have an infinitely variable adjustment range between a minimum length and a maximum length $x_{max}$. In this way, the spring elements are suitable for using adjustment lengths between the minimum length $x_0$ and the maximum length $x_{max}$ to compensate an inclination angle $\alpha$ that does not exceed a limiting angle $\alpha_{limit}$.

In a still further embodiment of the invention, the sensor also cooperates with an electronic brake system (EBS) and/or a roll stability support (RSS) system while the vehicle is travelling. In order to reduce the risk of tipping over, for example due to dynamic chassis loading, previously known systems have used, for example, transverse acceleration sensors for determining hazardous driving situations. The use of a transverse acceleration sensor, which is installed in conjunction with an RSS system or EBS, is particularly advantageous since there can be a saving in terms of additional components and costs.

In another embodiment of the invention, the control unit is designed to output a warning signal if a state is present in which, despite the length adjustment of the spring elements being used up, the sensor transmits a signal, which is to be assigned to an angle $\alpha$, that exceeds a limiting value $\alpha_{limit}$, between the vehicle body and the horizontal. Such a warning signal may be an optical signal, an audible signal or a combination of several types of signal. A further possible safety aspect would be an emergency stop of the pivoting process so that tipping can be prevented.

According to yet another embodiment, the ride-level-control system is embodied as an ECAS 2-point controller. This offers the advantage that the components of the system, which is already installed, can easily be used to carry out the automatic ride-level adjustment function without the need to install additional components.

In a further embodiment of the invention, the pivoting element is, in particular, a side-type or rear-type dump trough or a crane or a part of a weapon.

The objectives of the present invention are also achievable by embodiments of a method characterized by the steps of sensing an angle between the vehicle body and the horizontal utilizing a sensor, and triggering the ride-level-control process by the control unit as a function of the sensed angle.

In one embodiment of the method according to the invention, after the angle between the vehicle body and the horizontal has been sensed, the sensor outputs a signal that is assigned to or represents the sensed angle, and transfers the signal to the control unit by means of data transmission.

In another embodiment of the method according to the invention, the control unit brings about length adjustment of the spring elements by the received signal of the sensor.

According to a further embodiment, the control unit outputs a warning signal if, despite the fact that the entire adjustment travel $x=x_{max}$ of the spring elements is used up, the sensor transmits a signal that is to be assigned to an angle $\alpha$, which exceeds a limiting value $\alpha_{limit}$, between the vehicle body and the horizontal.

In another embodiment of the method of the present invention, before a pivoting process, in particular a side-type or rear-type dumping process, starts, the control unit brings about maximum shortening of the spring elements in order to lower the center of gravity of the vehicle body. If the shortest length of the spring elements $x_0$ is set on all the spring elements, the distance between the center of gravity and the axles of the vehicle in the vertical direction assumes a minimum value, and the angle that would lead to tipping over of the vehicle, unless a pivoting process and a ride-level-control operation were carried out, is maximized.

In a further embodiment of the method according to the invention, the ride-level-control operation takes place while the vehicle is travelling at less than a limiting speed $v_{limit}$. Since the vehicle is lowered, before the start of the pivoting process, to the lowest adjustment length of the spring elements in order to improve the tipping stability, a driving operation in this state is possible only to a limited degree. For this reason, initially, the speed at which the vehicle can travel in the lowered state can be limited.

In a still further embodiment of the method according to the invention, the ride-level-control operation takes place while the utility vehicle is travelling at less than a limiting speed. For some application purposes, in particular for military vehicles and agricultural machines, it may be necessary to carry out a ride-level-control operation during travel. In this case, the maximum permitted speed at which the vehicle can move is likewise below a limiting speed which, however, does not have to assume the same value as the limiting speed during the travel with the vehicle body lowered. Furthermore, it is apparent that the vehicle body is not lowered for the operation of the ride-level-control system. Instead, in such a case, the control unit has the function of lowering the side that is opposite the inclined side, and if possible of raising the side of the vehicle body on the side of the inclination.

In yet another embodiment of the method according to the invention, as soon as a limiting speed is exceeded, the control unit brings about adjustment of the spring elements to a normal length that is suitable for the travel mode of the utility vehicle. This measure is applied in a situation in which the vehicle body has been previously lowered to a minimum height.

The embodiments of the device and method according to the invention exhibit their advantages when employed in a utility vehicle having a vehicle body that has, in particular, an element that can pivot about a longitudinal axis or a transverse axis.

The utility vehicle can be a side-type or rear-type dump truck or trailer, an agricultural machine or a military vehicle. The center of gravity of the vehicle leads, owing to a pivoting movement about a vertical axis, to a state that is stable in terms of tilting since the supporting surface of the vehicle does not extend as far in the lateral direction as in the direction of the longitudinal axis of the vehicle. Taking this fact into account, the use of the device according to the invention and of the method according to the invention in cranes or lorries with a side-type dump trough is basically just as possible as in lorries with a rear-type dump trough. This applies analogously to military vehicles and agricultural vehicles, in particular tractors. Tractors provide a large working range for the ride-level-control system owing to the increased ground clearance and long spring travel distances.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention will be described in more detail below on the basis of exemplary embodiments and with reference to the appended figures, in which:

FIG. 6 is a flowchart of an embodiment of the method according to the invention.

DETAILED DESCRIPTION OF THE PREFERRED EMBODIMENTS

Figure 1:
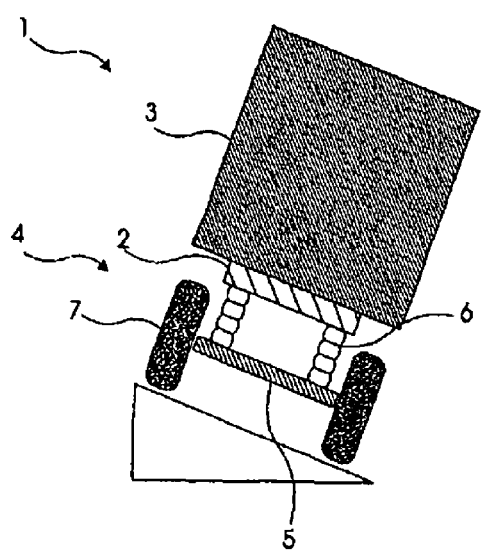
FIGS. 1-4 show rear views of a utility vehicle equipped according to an embodiment of the invention.

Referring now to the drawing figures, FIG. 1 shows a utility vehicle 1 employing a device 8 according to an embodiment of the invention in simplified form. The illustrated vehicle has a vehicle body 2 on which a pivoting element 3 is installed. The vehicle body 2 is connected to a chassis 4, which comprises axles 5, spring elements 6 and wheels 7 in this illustration. The position of the vehicle in FIG. 1 corresponds to travel or a stationary state on a sloping underlying surface with an angle $\alpha$ of inclination, and the spring elements 6 have a length suitable for the travel mode. It will be understood that this position can be taken as a starting point for initiation of embodiments of the method according to the present invention.

Figure 2:
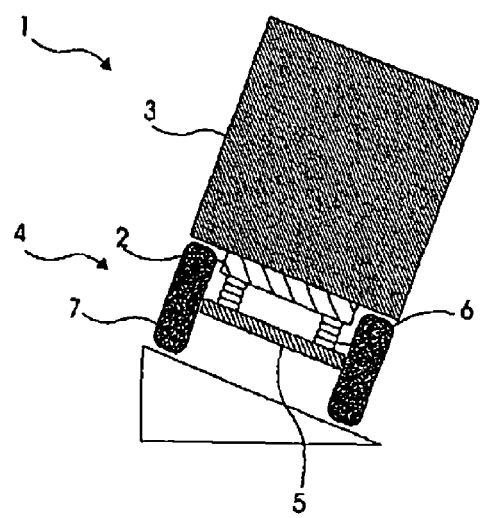

FIG. 2 illustrates the same vehicle as in FIG. 1. The spring elements 6 are lowered to a minimum length $x_0$ in this illustration. The center of gravity of the vehicle 1 is displaced as near as possible in the direction of the axles 5 of the vehicle 1 and is as close as possible to the center of the supporting surface. The supporting surface extends between the axles 5 of the vehicle 1 and encloses the contact surface of the wheels 7 with the underlying surface. As long as the weight vector, which is combined at the center of gravity of the vehicle, passes through the supporting surface, the position of the vehicle is stable in terms of tipping. It is apparent that owing to a pivoting process the center of gravity no longer passes through the supporting surface at a certain time, and this can cause the vehicle to tip over.

Figure 3:
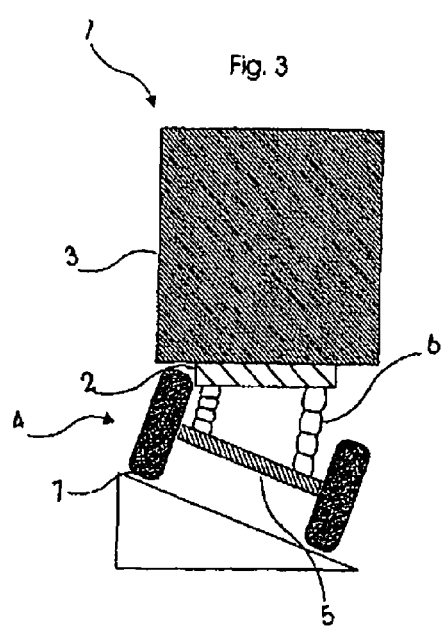

In order to reduce the risk of tipping over, the device 8 is used, by means of the method according to the invention, to move the vehicle body 2 into a horizontal position. The compensation is carried out by means of the selective adjustment of the spring elements 6. FIG. 3 shows the vehicle from FIGS. 1 and 2 with a compensated vehicle body. The spring element on the loaded side is lengthened until compensation has taken place or the maximum adjustment length $x_{max}$ has been reached.

Figure 4:
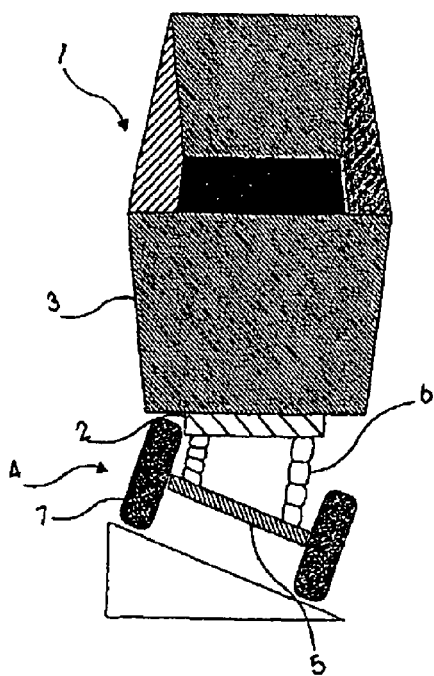

FIG. 4 illustrates the vehicle 1 from FIGS. 1 to 3 in a position in which a pivoting process, for example the pivoting process of a rear-type dump body 3, has been initiated. Since the vehicle body 2 of the vehicle 1 is located in a horizontal position, the center of gravity moves in the direction of a rear vehicle axle 5, but not in the lateral direction. The weight vector leaves the supporting surface of the vehicle 1 significantly later if the weight vector moves only in the direction of the longitudinal axis of the vehicle 1. From FIG. 4 it is apparent that in the case in which the adjustment range of the spring elements 6 is used up and complete compensation has not yet occurred, the center of gravity is moved in the lateral direction during a pivoting process, which results in a risk of tipping. If the inclination remaining after the maximum adjustment length $x_{max}$ of the spring elements 6 has been reached exceeds an angle $\alpha_{limit}$, there is the risk of the vehicle 1 tipping over. It is therefore necessary to provide measures that are suitable for preventing the triggering of a pivoting process in such a case.

Figure 5:
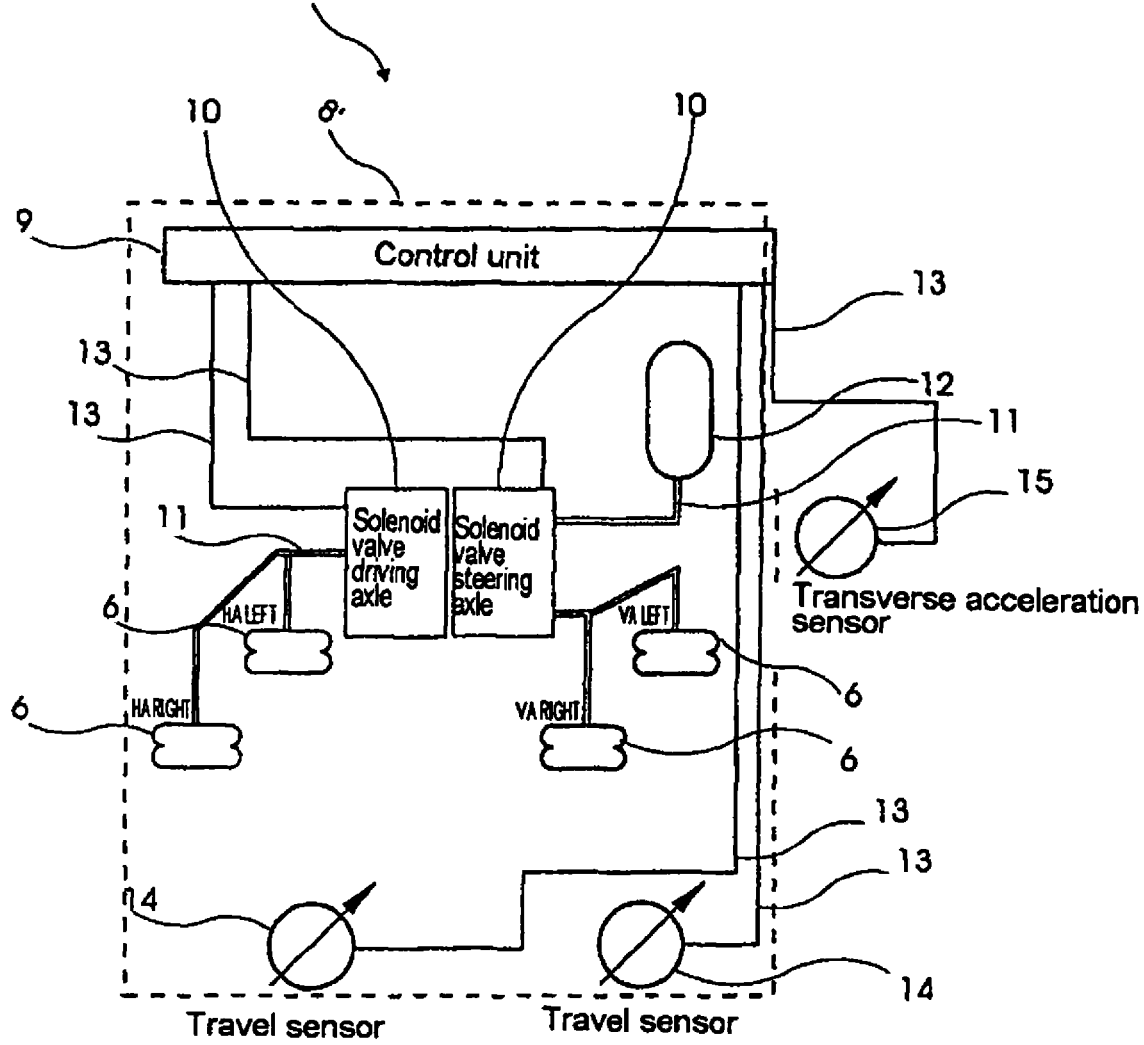
FIG. 5 is a schematic illustration of an embodiment of the device according to the invention.

FIG. 5 is a schematic illustration of an embodiment of the device 8 according to the invention. A control unit 9, which is connected via data transmission lines 13 to solenoid valves 10, travel sensors 14 and a transverse acceleration sensor 15, is shown here. Data transmission can readily also take place wirelessly, for example if the installation situation or other conditions require so. The control unit 9, the solenoid valves 10, spring elements 6 (embodied as air spring bellows in the drawing figure), and the travel sensors 14 cooperate with one another as an ECAS system in the illustrated embodiment. The transverse acceleration sensor 15 supplements this configuration in order to permit the device 8 to carry out the automatic ride-level adjustment function. The control unit 9 processes incoming signals from the sensors 14, 15. The signals transmitted by the transverse acceleration sensor 15 are interpreted as angle information and converted, by means of the control unit 9, into a length x, which is to be set for the spring elements 6. The transmission of air from a pressure vessel 12 to the spring elements 6 is controlled by the solenoid valves 10, which are controlled themselves by the control unit 9. The compressed air is transmitted by means of pressure lines 11. In FIG. 5, the solenoid valves 10 are arranged in such a way that a ride level adjustment of the front axle and of the rear axle is performed, but the arrangement and connection to the spring elements 6 can also be carried out such that in each case a right-hand side or left-hand side of the vehicle 1 or individual wheels 7 are actuated.

The sensing and evaluation of the signals of the transverse acceleration sensor do not necessarily have to be performed by the control unit 9. Instead, it is also possible to provide separate electronics, for example an electronic brake system, which perform signal sensing and processing and transmit a corresponding signal to the control unit 9.

FIG. 6 is a flowchart illustrating a method according to an embodiment of the invention. The programming of the control unit 9 is illustrated in simplified form. After a starting step 16 has begun, the spring elements 6 are instructed by the control unit 9 in a step 17 to adjust to the minimum length $x_0$. Once this state is reached, the control unit 9 checks, in a subsequent step 18, whether the speed v of the vehicle 1 exceeds a critical speed $v_{limit}$. If this is not the case, in a subsequent step 19, the sensing of the angle α of inclination by the sensor 15 is started by the control unit 9. However, if the speed v exceeds the programmed limiting value $v_{limit}$, the spring elements 6 are made, in a step 25, to adjust to a travel ride level, and the program is ended in a step 26.

If the sensing of the angle α has been started in step 19, the control unit 9 checks, in a step 20, whether an angle α of inclination is transmitted by the sensor, in particular the transverse acceleration sensor 15. If this is the case, the program jumps again to step 17 and starts again with the checking of the critical speed $v_{limit}$ (step 18) and, if appropriate, with the sensing of the angle α of inclination (step 19). However, if the transmitted angle α is not equal to zero, in a subsequent step 21a check is made as to whether the spring elements 6 have already reached their maximum adjustment value $x_{max}$ or whether there is still the possibility of length adjustment. If the current length x of the spring elements 6 is therefore less than $x_{max}$, the corresponding adjustment of the spring elements 6 is performed in a step 22.

If the length x of the spring elements 6 has already reached its value $x_{max}$, for example owing to repeated re-adjustment during the operation of the vehicle 1 or owing to an excessively large inclination α of the underlying surface, the control unit 9 checks, in a subsequent step 23, whether the remaining angle α of inclination exceeds a critical angle $\alpha_{limit}$ of inclination. If this is the case, in a subsequent step 24 a warning signal is output, which signals the presence of a risk of tipping. If the remaining angle α does not exceed the limiting value $\alpha_{limit}$, the programming jumps to step 17 again.

The program ends if, after the pivoting process has taken place, the speed v of the vehicle 1 exceeds the limiting value $v_{limit}$. As noted above, the spring elements 6 are set to a ride level, which is ready for travel (step 25).

Possible extensions of the programming relate to the possibility of, on the one hand, being able to intervene manually in the control of the ride level and of defining an angle α of inclination, which is then subsequently set by the control unit 9. On the other hand, it is conceivable that the pivoting process is not enabled until compensation into a horizontal position or at least to less than a critical inclination $\alpha_{limit}$ has taken place. Furthermore, it would be conceivable to initiate an automatic abort of the pivoting process if, due to influences of the ground, the inclination exceeds the range that can still be adjusted or if the critical angle $\alpha_{limit}$ of inclination is exceeded during the pivoting process.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A device for automatically adjusting the horizontal ride level of a utility vehicle, the utility vehicle having a vehicle body, a pivoting element pivotable about one of a longitudinal axis and a transverse axis and a ride-level-control system having spring elements of adjustable length, and a control unit, the device comprising a sensor for sensing an angle between the vehicle body and horizontal, the sensor being connectable to the control unit to trigger a ride-level-control process as a function of the sensed angle, the control unit being configured to lower the center of gravity of the vehicle body before commencement of one of a side-type and rear-type dumping process by maximum shortening of the spring elements.

2. The device according to claim 1, wherein the sensor is a transverse acceleration sensor.

3. The device according to claim 1, wherein the sensor is configured to output a signal assigned to the sensed angle between the vehicle body and horizontal, and wherein the sensor is connected to the control unit via data transmission lines.

4. The device according to claim 1, wherein the control unit is configured to effect length adjustment of the spring elements as a function of the sensed angle.

5. The device according to claim 1, wherein the spring elements are air spring bellows.

6. The device according to claim 1, wherein the spring elements have an infinitely variable adjustment range between a minimum length and a maximum length.

7. The device according to claim 6, wherein the sensor cooperates with at least one of an electronic brake system and a stability system while the utility vehicle is travelling.

8. The device according to claim 1, wherein the control unit is configured to output a warning signal when a length adjustment of the spring elements is used up and the sensed angle exceeds a limiting value.

9. The device according to claim 1, wherein the ride-level-control system is an ECAS 2-point controller.

10. The device according to claim 1, wherein the pivoting element is one of a side-type and rear-type dump trough.

11. A method for automatically adjusting the horizontal ride level of a utility vehicle having a vehicle body having a pivoting element pivotable about one of a longitudinal axis and a transverse axis, and a ride-level-control system including spring elements of adjustable length and a control unit, the method comprising the steps of:

lowering the center of gravity of the vehicle body before commencement of one of a side-type and rear-type dumping process by maximum shortening of the spring elements;

sensing an angle between the vehicle body and horizontal using a sensor; and triggering a ride-level-control process by the control unit as a function of the sensed angle.

12. The method according to claim 11, wherein the ride-level-control operation takes place while the utility vehicle is travelling at less than a limiting speed.

13. The method according to claim 11, further comprising the step of adjusting the spring elements to a length suitable for travel when a limiting speed of the utility vehicle is exceeded.

14. A utility vehicle, comprising a vehicle body having an element pivotable about one of a longitudinal axis and a transverse axis, and the device for automatically adjusting horizontal ride level according to claim 1.

15. The utility vehicle according to claim 14, wherein the utility vehicle is one of a side-type and rear-type dump truck, an agricultural machine and a military vehicle.

16. The utility vehicle according to claim 1, wherein the control unit is further configured to trigger a ride-level-control process as a function of the sensed angle as the sensed angle changes during a pivoting process of the pivoting element.

17. The method according to claim 11, wherein the sensing the angle between the vehicle body and horizontal using a sensor occurs as the sensed angle changes during a pivoting process of the pivoting element.

18. The method according to claim 11, further comprising the steps of outputting a signal representing the sensed angle, and transmitting the signal to the control unit.

19. The method according to claim 11, wherein the step of triggering a ride-level-control process as a function of the sensed angle includes effecting length adjustment of the spring elements as a function of the sensed angle.

20. The method according to claim 11, further comprising the step of outputting a warning signal when an entire adjustment travel of the spring elements is used up and the sensed angle exceeds a limiting value.

* * * * *

UNITED STATES PATENT AND TRADEMARK OFFICE
CERTIFICATE OF CORRECTION

PATENT NO.        : 8,655,577 B2
APPLICATION NO. : 12/734247
DATED             : February 18, 2014
INVENTOR(S)       : Axel Stender It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 691 days.

Signed and Sealed this
Twenty-ninth Day of September, 2015

Michelle K. Lee
*Director of the United States Patent and Trademark Office*